March 19, 1963
J. P. MOORHEAD ETAL
3,081,715
FREIGHT-LOADING APPARATUS
Filed Nov. 14, 1958
3 Sheets-Sheet 1
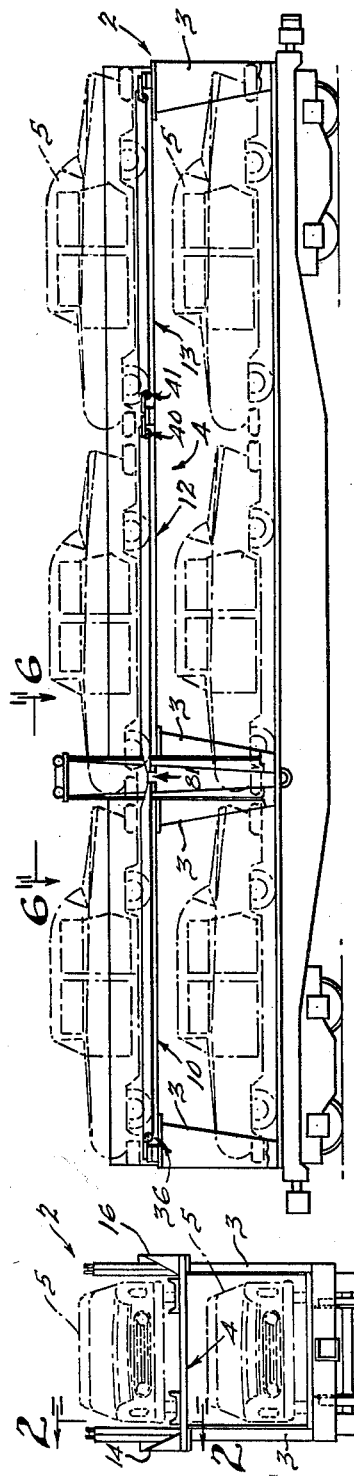
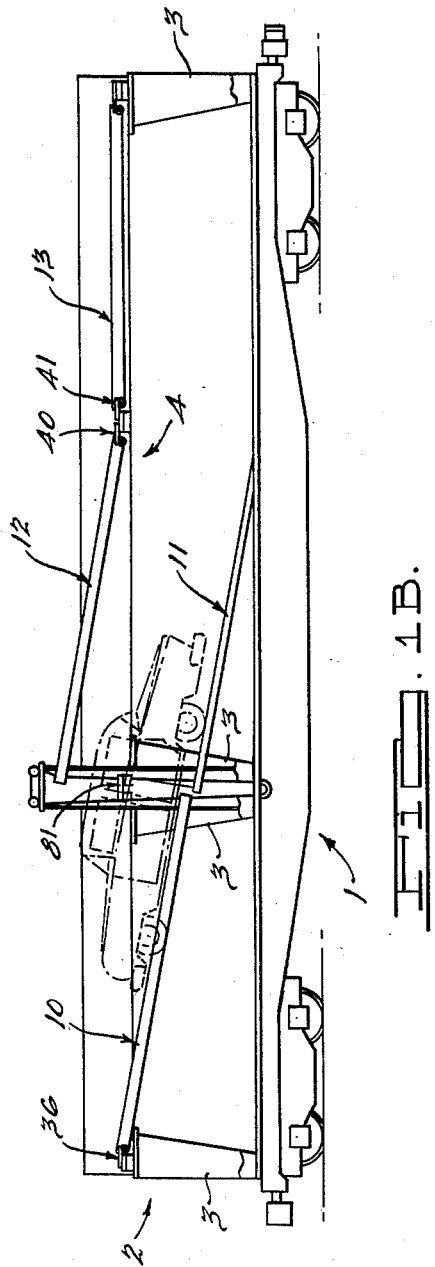
INVENTORS.
John P. Moorhead.
James H. Lowing.
BY
Harness, Dickey & Pierce.
ATTORNEYS.

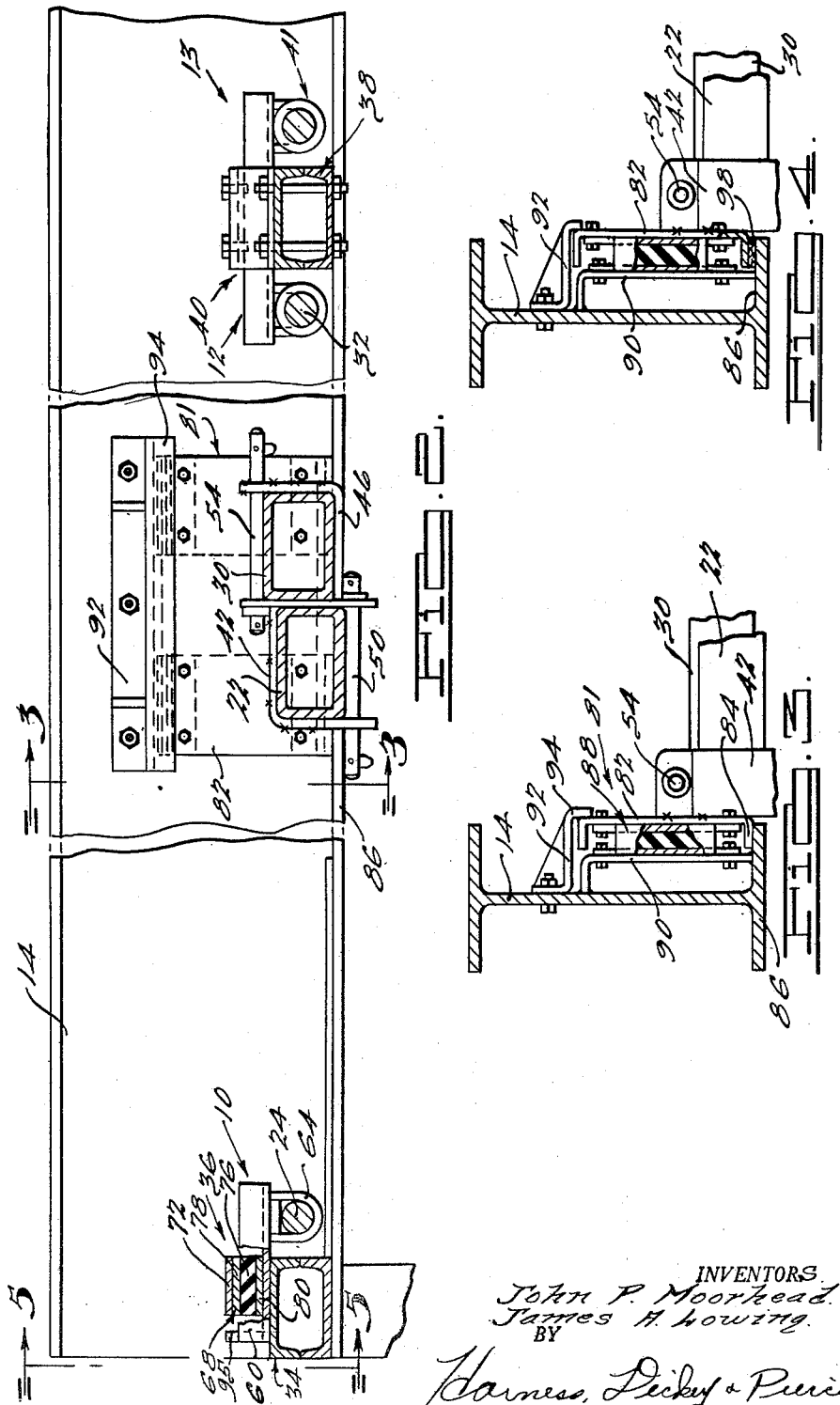

March 19, 1963 J. P. MOORHEAD ETAL 3,081,715
FREIGHT-LOADING APPARATUS
Filed Nov. 14, 1958 3 Sheets-Sheet 3

INVENTORS
John P. Moorhead
James A. Lowing
BY Harness, Dickey & Pierce
ATTORNEYS United States Patent Office 3,081,715
Patented Mar. 19, 1963

1

3,081,715
FREIGHT-LOADING APPARATUS
John P. Moorhead and James A. Lowing, Plymouth, Mich., assignors to Evans Products Company, Plymouth, Mich., a corporation of Delaware
Filed Nov. 14, 1958, Ser. No. 773,949
5 Claims. (Cl. 105—368)

This invention relates broadly to new and useful improvements in carriers for automotive vehicles and more particularly to a novel mounting for relieving the tie-downs which connect the vehicles to the carrier of shock loads to which they otherwise are subjected in use and which frequently are sufficiently severe to break or otherwise damage the tie-downs or their adjuncts.

Although not necessarily limited thereto, the shock-absorbing mounting of this invention is primarily adapted and pre-eminently suited for use in automotive carriers of the type shown in copending application Serial No. 487,518, filed in the Patent Office February 11, 1955, now Patent No. 2,929,339 and assigned to the assignee hereof. This application is concerned primarily with the transportation of automotive vehicles by rail, and discloses specially constructed double-deck railway cars capable of transporting a relatively large number of automobiles. A novel ramp arrangement incorporated in the car permits the vehicles to be moved readily between the upper and lower decks, and the arrangement is such that the ramp structures support certain of the vehicles during transportation thereof. The other vehicles not supported by the movable ramp structures rest either upon a flat deck surface or on supporting rails provided for the purpose.

Regardless of the nature of the supporting structure, however, it is essential in every instance to fasten the vehicles securely to the carrier by means of tie-down devices of a suitable nature. It is desirable, particularly in the case of a railroad car form of carrier, to provide some means for relieving the tie-downs and associated structures of shock loads. These loads may occur under a variety of conditions, but they are particularly severe when the carrier car is being coupled to another car or when another car is being coupled to the carrier car or to a train of which the carrier car is a part. Shock loads imposed on the tie-downs under these conditions often are sufficient to break or damage them or their connections or even the underframes of the vehicles to which they are connected. The instant invention provides a shock-absorber mounting for the structure which carries the automobile and to which the automobile is securely fastened. In its preferred form, it does not carry the dead load of the automobile but is located to take impact or shock loads.

In order to illustrate the invention, reference is now had to the accompanying drawings, wherein:

FIG. 1A is an end elevation of a railway car having a shock-mounted ramp construction embodying the invention;

FIG. 1B is a side elevation of the railway car of FIG. 1A with portions thereof broken away showing the ramps in ramp forming position;

FIG. 1C is a side elevation similar to FIG. 1B showing the ramps in their final in-transit position and fully loaded;

FIG. 2 is a fragmentary, longitudinal, sectional view,

Figure 5:
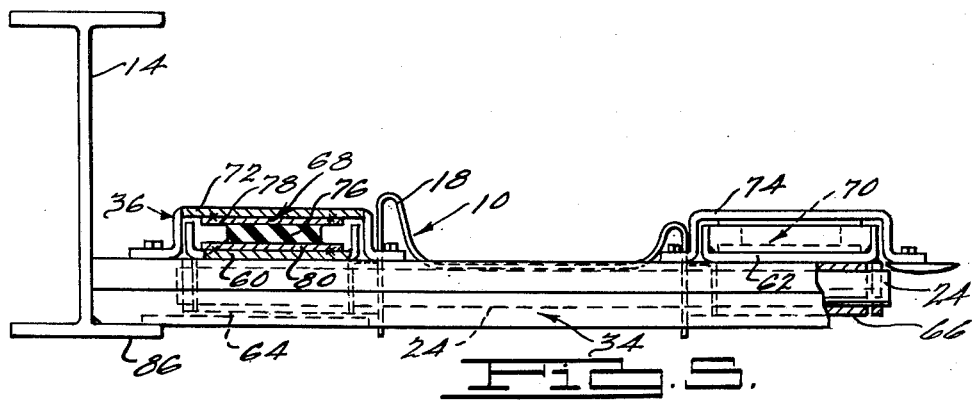
Figure 6:
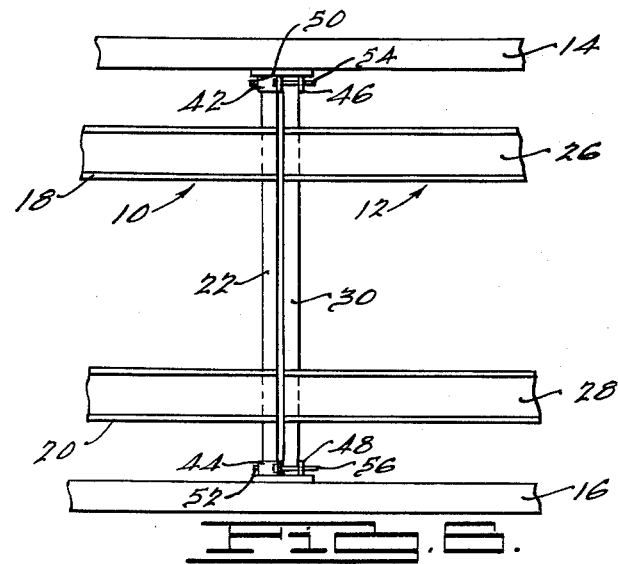
Figure 7:
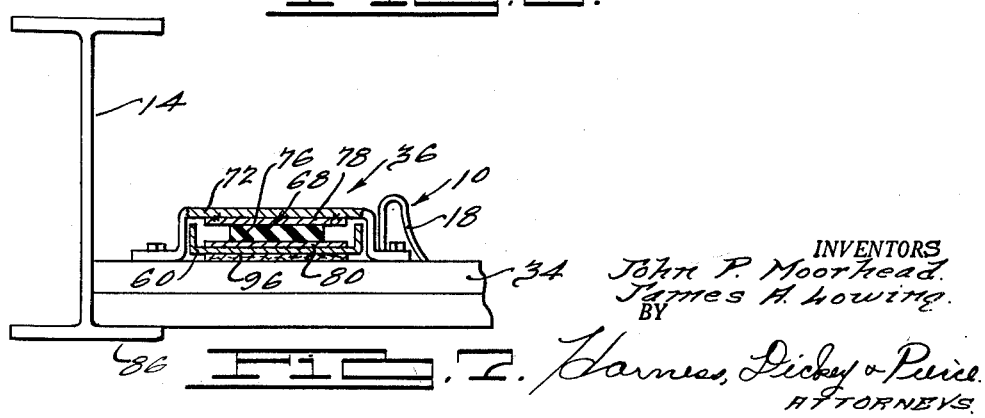

2 taken along the line 2—2 of FIG. 1A, certain parts being omitted for clarity;

FIG. 3 is a fragmentary, vertical, sectional view, taken on the line 3—3 of FIG. 2, certain parts being omitted for clarity;

FIG. 4 is a view similar to FIG. 3 but showing a shock absorber of modified construction;

FIG. 5 is a fragmentary view, partially broken away, taken on the line 5—5 of FIG. 2;

FIG. 6 is a fragmentary, top plan view, taken along the line 6—6 of FIG. 1C, certain parts being omitted for clarity; and FIG. 7 is a view similar to FIG. 5 but showing a modified shock-absorber construction.

Reference is first had to FIGS. 1A, 1B and 1C which illustrate the basic principle of the invention as adapted for use with a railway flatcar having a super structure 2 as shown and described in greater detail in the copending application Serial No. 487,518 hereinabove referred to, but it will be readily appreciated that the shock mounting of this invention can be incorporated in other ramp constructions.

The super structure 2 has a plurality of upright members 3 for supporting an upper deck structure 4 which in turn supports a number of automobiles 5 above the deck of the flatcar. This enables additional automobiles to be stored on the deck of the flatcar itself and consequently provides a double deck arrangement that increases the number of automobiles that can be carried. To load the automobiles on the upper deck structure, the right end of ramp structure 10 is suitably lowered as shown and the left end of ramp structure 12 is raised along with the left end of ramp structure 11 therebelow, the latter being aligned with the ramp 10. An automobile may then be driven up the ramp 11 and onto the ramp 10 as illustrated in FIG. 1B, the raised end of ramp 12 providing clearance for the automobile to pass under. When the automobile is completely on the ramp 10, the ramp is raised which lowers the ramp 12 so that both are in the position illustrated in FIG. 1C. The automobile can then be backed onto a fixed ramp structure 13 on the right end of the upper deck structure and the operation repeated until all the automobiles are on the upper deck structure after which the lower deck is loaded. The foregoing manner in which the upper deck is loaded has been briefly described since it is described in greater detail in the aforementioned copending application.

The two ramps 10 and 12 are in the normal horizontal position (e.g. parallel to bed 1) during transportation of the vehicles and are supported between side members 14 and 16 which in turn are supported on the upright members 3. Each ramp supports a separate automobile which is fastened securely thereto in any suitable or conventional manner but preferably by means of the tie-down device disclosed in application Serial No. 487,518. In the construction here shown, each ramp is individually shock mounted in a manner to distribute the total load on the ramps relatively uniformly among the various shock mountings.

As most clearly illustrated in FIGS. 2, 3, 5 and 6, the ramp 10 comprises a pair of parallel rails or wheel tracks 18 and 20 disposed longitudinally of the car and arranged to receive the wheels on opposite sides of the vehicle carried on the ramp. Cross supporting members 22 are welded or otherwise fastened securely to the rails 18 and 20 at the pivoting end of the ramp 10, and a transverse pivot shaft 24 is fastened to each of the rails 18 and 20 at the pivoted end of the ramp. If desired, additional transverse or cross bracing can be incorporated in the structure of the ramp 10.

Similarly, the ramp 12 comprises a pair of spaced, parallel rails 26 and 28 extending longitudinally of the car and in alignment with rails 18 and 20 respectively. Cross supporting members 30 are welded or otherwise fastened to the rails 26 and 28 at the pivoting end of the ramp, and a transverse pivot shaft 32 is suitably connected to each of the rails at the pivoted end of the ramp. As in the case of the ramp 10, additional transverse or cross bracing can be provided for the ramp 12, as desired.

The pivot shaft 24 are fastened to a cross-frame member 34 of the car by a shock mounting designated generally at 36, and the cross pivot shafts 32 are connected to a cross-frame member 38 of the car by a shock mounting designated generally at 40. The fixed ramp structure 13 is disposed at the right of the ramp 12, and this structure is resiliently suppported by a connection designated generally as 41 at one end of the shock mounting 40 and at the other end thereof by a shock mounting (not shown) similar to the mounting 36. As seen in FIGS. 2, 3, and 6, the cross supporting members 22 and 30 at the ends of the ramps 10 and 12 have laterally extending portions which swing upwardly into and drop into U-shaped supporting brackets 42 and 46, respectively, on side member 14. The connection to the side member is the same except for being of opposite hand and, therefore, only the connection to the member 14 is shown and described. Locking pin 50 holds the cross supporting member 22 in the bracket 42, and locking pin 54 retains the cross-supporting member 30 in the bracket 46.

When it is desired to lower the ramp structure 10 to provide a runway of the type hereinabove referred to, it is merely necessary to remove the lock pin 50. This releases the cross supporting member 22 which is then free to be lowered out of the bracket 42. Similarly, when it is desired to raise the ramp 12, locking pin 54 is removed to release the cross-supporting member 30 for upward movement out of the bracket 46. The ramps 10 and 12 preferably are swung about their pivots 24 and 32 by chain-drive mechanisms of the type shown in the aforementioned copending application, Serial No. 487,518. Conversely, when it is desired to fasten the ramps 10 and 12 in the normally horizontal position, the ramp 10 is raised to engage the cross-supporting member 22 in the bracket 42 and the ramp 12 is lowered to engage the cross-supporting member 30 in the bracket 46. The locking pins 50 and 54 are then applied as shown in FIG. 2 to hold the ramps securely in place.

Vehicles are driven on the ramps 10 and 12 with the tires supported on the rails 18, 20 and 26, 28 respectively and then fastened securely to the ramps for shipment. In this instance, it is preferred that the tie-downs (not shown) used to fasten the vehicles directly to the ramps 10 and 12 be essentially rigid and unyielding so that the vehicles cannot move relative to the ramps except through deflection of their tires. In order to prevent shock loads from overstressing the tie-downs or damaging the vehicles, the ramps themselves are resiliently mounted; viz., the ramps are mounted so that they are, in effect, floated structures connected to the main frame of the car by resilient mountings or shock absorbers. Thus, the ramps 10 and 12 are free to move within limits relative to the main frame of the car, and the limits of movement are defined by the shock absorbers which connect the ramps to the car. It is contemplated, of course, that the shock absorbers be relatively stiff in operation and that they offer relatively great resistance to shock movement of the ramps. However, when the car is subjected to shock loads of a magnitude sufficient to damage or break the tie-down connections or other parts of the car supporting structure, the shock absorbers yield sufficiently to dampen or reduce the force of the shock and thus relieve the parts of excessive or damaging forces.

Since the two ramps 10 and 12 are similarly mounted, a detailed description of one only, ramp 10, will be given. This ramp has a separate resilient mounting at each of its four corners. The two resilient mountings at the pivoted end of the ramp (not seen in FIG. 6) are identical and one of these mountings is shown in detail in FIG. 5. This figure illustrates particularly the mounting for the pivot shaft 24 which is carried by the rail 18. As shown in the drawings the terminal portions of the shaft 24 project beyond the sides of the rail 18, and a separate shock absorber unit is attached to each terminal portion. In this connection, it is significant that the cross frame member 34 is spaced beyond the left end of the rail 18 which is supported on the frame member 34 through the shock absorber mounting 36. More particularly, the mounting 36 comprises upwardly presenting bearing supporting channels 60 and 62 which rest upon the frame member 34 at opposite sides of the rail 18 and extend from the member 34 in the direction of the ramp 10. Bearings 64 and 66 on the projecting portions of the webs of the channels 60 and 62 receive the terminal portions of the shaft 24; and as the end of the ramp 10, seen in FIG. 6, is swung in the manner hereinabove described, the shaft 24 turns in the bearings. Sandwich-type rubber shock absorbers 68 and 70 are mounted on and fastened securely to the channels 60 and 62 and are in turn connected to downwardly presenting supporting channels 72 and 74 bolted or otherwise fastened to the cross frame member 34 (FIG. 5).

The shock absorbers 68 and 70 each comprise a block of rubber 76 disposed between and vulcanized to a pair of plates 78 and 80. In this instance, the plates 78 of the shock absorbers are on top and fastened securely to the channels 72 and 74, and the plates 80 are on the bottom and fastened securely to the bearing supporting channels 60 and 62. The channels 60 and 62 are free to move, except for frictional resistance between the parts, on the frame member 34, but it will be noted that they transmit the gravity load of the ramp and its vehicle directly to the frame or supporting structure by way of member 34 without such load passing through the rubber 76.

A shock mounting 81 is provided at each side of the car in alignment with the swinging ends of the ramps 10 and 12. One of the shock mountings 81 is shown in detail in FIG. 3, and it will be understood that the other shock mounting 81 is similar in every material respect. The shock mounting there shown incorporates the brackets 42 and 46 as a part of the general structure, and the brackets are welded or otherwise fixed to an upright, generally channel-shaped support 82. The lower flange 84 of the support rests upon and slidably engages the flange 86 of the side frame member 14 to transmit gravity load of the ramp and vehicle directly to the frame. Sandwich-type shock absorbers 88, similar to the shock absorbers 68 and 70 hereinabove described in detail, are bolted or welded in laterally spaced relation to the support 82 and also to a fixed mounting bracket 90 which is welded or otherwise fastened securely to the side frame member 14, and yieldably resist sliding of the ramp relative to the frame. A holding bracket 92 fastened to the frame member 14 above the support 82 extends laterally outwardly over the support and a depending flange 94 thereon overlies the support 82 to retain the upper end thereof. The arrangement shown provides adequate support for the ramp 10 and at the same time readily absorbs shocks which otherwise would be transmitted from the car to the ramp and thence through the tie-downs to an automobile on the ramp. As a result of this construction, the ramps 10 and 12 are coupled together by the shock mountings 81, and the ramp 12 and the ramp 13 hereinabove referred to at the right-hand end of the car are coupled together by the shock mountings 40.

Excessive lateral movement of the ramps and consequential over-stressing of the shock mountings 36, 40, and 81 are prevented by stops incorporated in the ramp structures at the mountings. Upstanding flanges 95 (FIG. 2) on the supporting channels 60 of the endmost mountings engage the supporting channels 72 to limit inward movement of the end ramps. Outward movement of these ramps is limited by engagement of the bearings 64 and 66 with the cross frame members 34. Additional stops are provided by engagement of the depending portions of the mountings 40 and 41 with the cross frame member 38. Since all the ramps or other supporting structure on the upper deck of the car are coupled together in a manner hereinabove described, they all move in unison and thus tend to distribute a shock load applied particularly to any one part of the structure, and any tendency for the shock-mounted structure to shift beyond the elastic limits of the resilient mountings is prevented by three separate stop means distributed along the length of the structure.

If desired, friction layers 96 can be interposed between the webs of the bearing supporting channels 60 and 62 and the cross frame member 34 as shown in FIG. 7, and friction layers 98 can be interposed between the web of the support 82 and the supporting flange 86 of the side frame member 14, as shown in FIG. 3, to slow down the rebound and to limit oscillation of the ramp 10 as a result of shock transmitted through the resilient mountings. The friction layers 96 and 98 can be of any material suitable for the purpose. Brake-band material provides a representative friction layer as it has the necessary antifriction characteristics and is adequately tough and strong to withstand abuse to which it is subjected in use. If desired, space required for the friction material can be obtained by compressing the rubber mount or putting it in shear, thus preloading the friction material.

It may thus be seen that we have accomplished the objects of our invention. We have provided a novel shock mounting that is primarily adapted and pre-eminently suited for transportation of automotive vehicles and more particularly the transportation of automotive vehicles by rail. We have provided a novel mounting which relieves the tie-down devices conventionally used to fasten the vehicles in place during transportation of excessive and destructive stresses and strains to which they normally are subjected and which also prevents over-stressing of the vehicle subframes to which the tie-downs are fastened. The arrangement here shown effectively prevents relative motion between the automotive vehicle and the means which support it so as to prevent excessive wear of the vehicle tires during transportation. The arrangement shown permits the use of conventional tie-down devices and does not require, apart from the mounting itself, the use of any unusual equipment or apparatus. Conventional railway cars can be easily equipped with shock mountings embodying the invention, and cars so equipped can be used in the ordinary conventional manner. In most instances it is possible to place the shock mountings so that they are conveniently accessible for servicing or replacement.

What is claimed is:

1. In a carrier for automotive vehicles, a carrier body frame adapted to receive and support a plurality of automotive vehicles, a ramp mounted for vertical swinging movement on said carrier body frame and adapted to support a vehicle thereon and to have said vehicle fastened securely thereto, pivots on said ramp at one end thereof, a cross supporting member on said ramp at the other end thereof, bearing plates carried by and longitudinally movable relative to said body frame having bearings receiving said pivots, shock absorbers fastened to said bearing plates and to said body frame for yieldably resisting the relative longitudinal movement between said bearing plates and said body frame, catch means arranged to receive and detachably connect said cross supporting member to said body frame, said catch means being mounted on said carrier body frame for limited longitudinal movement relative thereto, and shock absorbers fastened to said catch means and said body frame yieldably resisting relative longitudinal movement therebetween.

2. In a carrier for transporting vehicles, a carrier body frame adapted to receive and support a plurality of automotive vehicles, a pair of normally horizontally aligned ramp structures for supporting vehicles thereon, catch means for detachably connecting the adjacent ends of said ramp structures to said carrier body frame, pivot means for pivotally connecting the other ends of said ramp structures on said carrier body frame, each of said pivot means and said catch means being slidably mounted on said body frame for limited longitudinal movement relative thereto, and shock absorber means for yieldably resisting said longitudinal movement whereby said pair of ramp structures and vehicles mounted thereon move in unison under load, each said pivot means and said catch means including a ramp connecting member and said shock absorber means including a rubber element at each ramp member connected thereto and to said body frame.

3. In a carrier for transporting vehicles, a carrier body frame adapted to receive and support a plurality of automotive vehicles, a pair of normally horizontally aligned ramp structures for supporting vehicles thereon, catch means for detachably connecting the adjacent ends of said ramp structures to said carrier body frame, pivot means for pivotally connecting the other ends of said ramp structures on said carrier body frame, each of said pivot means and said catch means being slidably mounted on said body frame for limited longitudinal movement relative thereto, and shock absorber means for yieldably resisting said longitudinal movement whereby said pair of ramp structures and vehicles mounted thereon move in unison under load, said catch means comprising a plate slidably supported on said body frame for limited longitudinal movement relative thereto, rubber elements disposed between and affixed to said plate and body frame for yieldably resisting the relative longitudinal movement therebetween, two adjacent U-shaped brackets mounted on said plate means, one of said brackets being upwardly presenting and the other of said brackets being downwardly presenting, a transverse member affixed to each of the adjacent ends of said ramp structures, one of said cross members being retained in the upwardly presenting U-shaped bracket and the other of said cross members being retained in the downwardly presenting U-shaped bracket, and removable pin means for retaining said cross members in said U-shaped brackets.

4. In a carrier for transporting vehicles, a carrier body frame adapted to receive and support a plurality of automotive vehicles, a pair of normally horizontally aligned ramp structures for supporting vehicles thereon, catch means for detachably connecting the adjacent ends of said ramp structures to said carrier body frame, pivot means for pivotally connecting the other ends of said ramp structures on said carrier body frame, each of said pivot means and said catch means being slidably mounted on said body frame for limited longitudinal movement relative thereto, and shock absorber means for yieldably resisting said longitudinal movement whereby said pair of ramp structures and vehicles mounted thereon move in unison under load, said pivot projecting laterally from each of the other ends of said ramp structures and each of said pivot means comprising a bearing plate slidably mounted on said carrier body frame for limited longitudinal movement relative thereto and rubber elements disposed between and connected to said bearing plate and body frame for yieldably resisting the longitudinal movement therebetween, said pivot being pivotally connected to said bearing plate.

5. The subject matter as claimed in claim 1 including co-operating friction means on said ramp and on said carrier body frame rendered operative by relative movement between said ramp and said carrier body frame longitudinally of the latter to further resist and dampen said relative movement.

References Cited in the file of this patent

UNITED STATES PATENTS

| | | |
|---|---|---|
| 1,496,782 | Lightner | June 10, 1924 |
| 1,969,844 | Heath | Aug. 14, 1934 |
| 2,047,955 | Fitch | July 21, 1936 |
| 2,094,407 | Nampa | Sept. 28, 1937 |
| 2,165,375 | Heitner | July 11, 1939 |
| 2,272,639 | Jack | Feb. 10, 1942 |
| 2,432,228 | De Lano | Dec. 9, 1947 |
| 2,647,009 | Huebshman | July 28, 1953 |
| 2,728,305 | Candlin | Dec. 27, 1955 |
| 2,868,368 | Beach | Jan. 13, 1959 |
| 2,873,693 | Chapman et al. | Feb. 17, 1959 |
| 2,908,527 | Risner | Oct. 13, 1959 |
| 2,929,339 | Schueder et al. | Mar. 22, 1960 |
| 2,977,899 | Doherty et al. | Apr. 4, 1961 |